United States Patent
Evans et al.

[11] Patent Number: 5,899,081
[45] Date of Patent: May 4, 1999

[54] HEATING AND COOLING UNIT USING POWER INVERTER WITH BATTERY

[75] Inventors: David K. Evans, Albion; Ernest E. Williams, Angola, both of Ind.

[73] Assignee: White Consolidated Industries, Inc., Cleveland, Ohio

[21] Appl. No.: 08/829,243

[22] Filed: Mar. 31, 1997

[51] Int. Cl.⁶ .......................... F25B 27/00; F25B 13/00
[52] U.S. Cl. ........................ 62/126; 62/236; 62/323.3
[58] Field of Search .................... 62/236, 323.3, 62/244, 129, 126, 235.1

[56] References Cited

U.S. PATENT DOCUMENTS

| | | | |
|---|---|---|---|
| 2,479,170 | 8/1949 | Kuempel | 62/323.3 X |
| 2,806,358 | 9/1957 | Jacobs | 62/244 X |
| 3,943,726 | 3/1976 | Miller | 62/235.1 |
| 3,974,660 | 8/1976 | Farr | 307/66 X |
| 4,006,603 | 2/1977 | Miles | 62/229 |
| 4,280,330 | 7/1981 | Harris et al. | 62/236 X |
| 5,200,644 | 4/1993 | Kobayashi et al. | 62/236 X |
| 5,333,678 | 8/1994 | Mellum et al. | 62/236 X |
| 5,438,842 | 8/1995 | Watkins et al. | 62/244 X |
| 5,488,279 | 1/1996 | Kawamoto et al. | 62/236 X |
| 5,501,267 | 3/1996 | Iritani et al. | 237/21 B |
| 5,544,493 | 8/1996 | Suzuki et al. | 62/133 |
| 5,595,064 | 1/1997 | Ikeda et al. | 62/230 X |

*Primary Examiner*—William E. Wayner
*Attorney, Agent, or Firm*—Pearne, Gordon, McCoy & Granger LLP

[57] ABSTRACT

The present invention is directed towards a temperature regulation system for providing heating and cooling for an interior of a truck. The temperature regulation system may be operated for an extended period of time without relying on the truck's engine or start battery for power. Therefore, the apparatus is ideal for heating and cooling a sleeping compartment within the truck while the engine is not running. The temperature regulation system comprises a climate control unit having a power control board, a control terminal having operator adjustable controls, a power inverter having a direct current input and an alternating current output, and a secondary battery.

15 Claims, 2 Drawing Sheets

HEATING AND COOLING UNIT USING POWER INVERTER WITH BATTERY

BACKGROUND OF THE INVENTION

The present invention relates to an apparatus for providing air conditioning and heating for a truck. The apparatus is specially adapted to provide a temperature regulated environment for a sleeper compartment of the truck when the truck is not running.

Various approaches to heating and cooling vehicles are known. Generally, the vehicles are heated by a heat pump unit and cooled by an air conditioner unit. These climate control units are generally powered, directly or indirectly, by the vehicle's engine or primary battery. Often, an inverter is used to convert direct current supplied by the vehicle's primary battery into alternating current for use by the climate control unit. See for example, U.S. Pat. No. 3,974,660 to Farr et al.

Sometimes, alternative sources of power for the climate control units are used. For example, U.S. Pat. No. 5,333,678 to Mellum et al. shows the use of an auxiliary fuel-burning engine to supply power to the climate control units of a truck.

In vehicles where an occupant may sleep in the vehicle, or spend a long period of time in the vehicle, while the engine is not running there remains a need to power climate control units without relying on the power sources thus far identified. It is desirous not to run the engine for many reasons, including reducing the wear and tear on the engine, fuel savings, improved air quality from reduced emissions and compliance with "no idle" laws. If the primary battery were used to power the climate control units while the engine is not running, the primary battery's charge could be depleted and it would not be able to perform its other duties.

SUMMARY OF THE INVENTION

The present invention is directed towards an apparatus for providing a temperature regulated environment for a truck. The truck has an internal combustion engine, a driving compartment and sleeping compartment, a primary battery used to start the engine, and a climate control unit for controlling the temperature the truck's interior. The climate control unit is regulated by a control terminal and is electrically powered by a secondary battery. Since the climate control unit does not obtain power from a running engine or the primary battery, the apparatus is ideal for heating and cooling the sleeping compartment while the engine is not running.

In further accordance with the present invention, the truck is provided with an ignition switch having an on and an off position. When the ignition switch is in the on position, the engine is running and a charge solenoid is used to connect the primary battery to the secondary battery.

In further accordance with the present invention, the secondary battery supplies electrical power to the climate control unit via an inverter. The inverter acts to convert direct current supplied by the secondary battery into alternating current used by the climate control unit.

DESCRIPTION OF THE PREFERRED EMBODIMENTS

It should be noted that in the detailed description which follows, identical components have been given the same references numerals, and that in order to clearly and concisely illustrate the present invention, certain features may be shown in somewhat schematic form.

Figure 1:
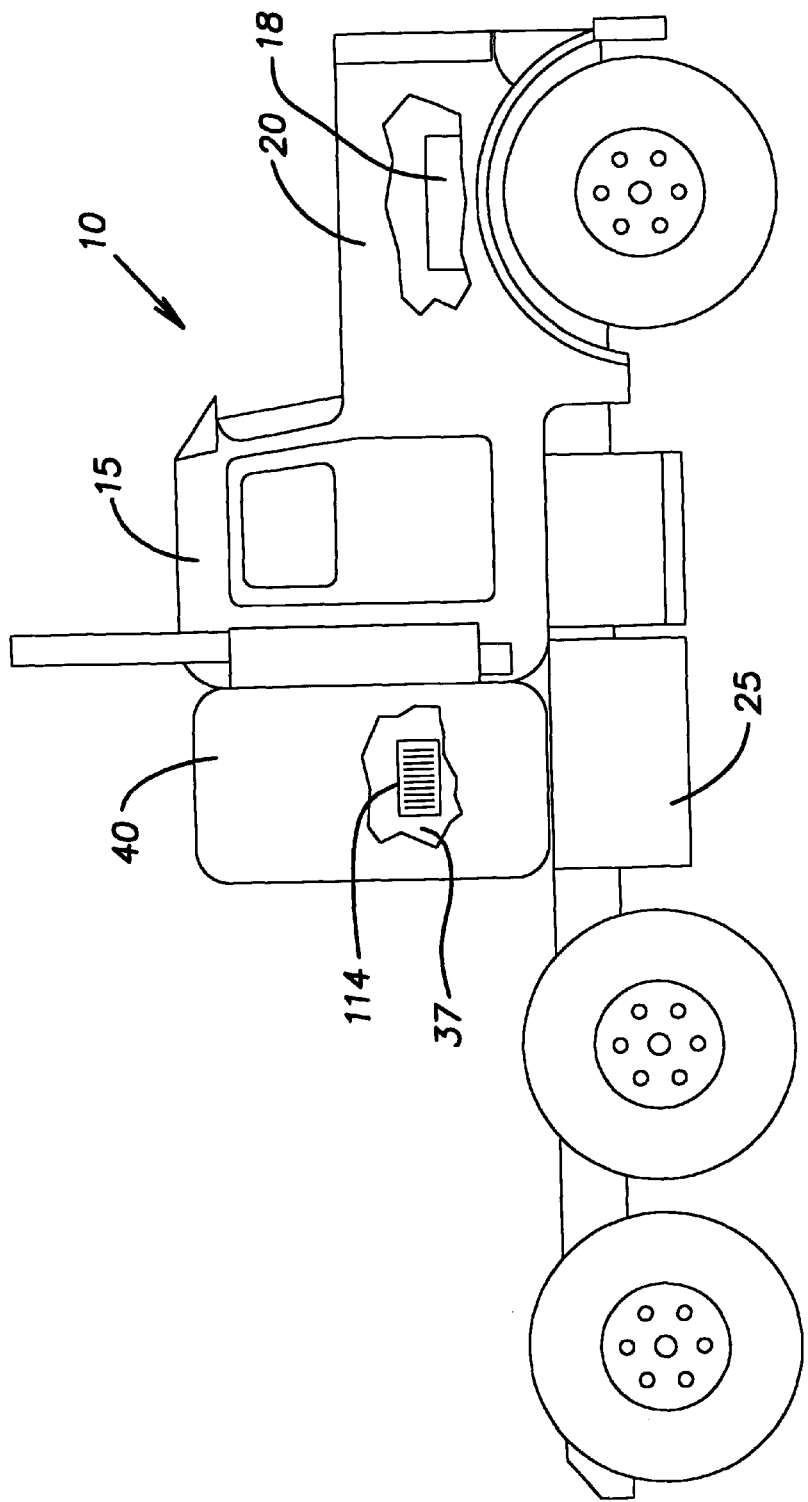
FIG. 1 is a side view of a truck according to the present invention, with portions of the truck shown cutaway.
Figure 2:
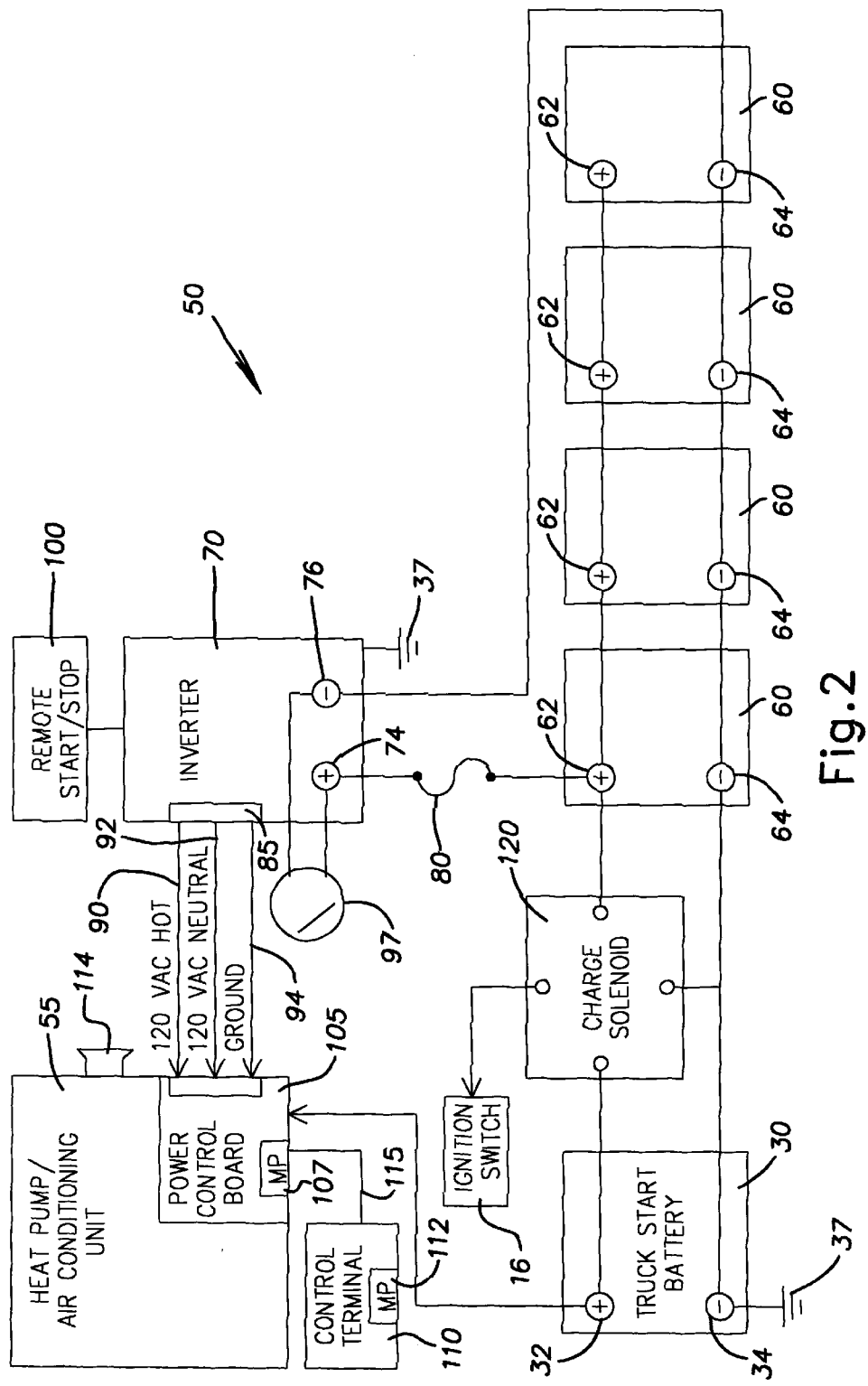
FIG. 2 is a circuit diagram of the temperature regulation apparatus according to the present invention.

Referring now to FIGS. 1 and 2, a truck 10 according to the present invention is shown. The truck 10 has a driving compartment or cab 15 from which an operator may drive the truck 10. For this purpose, the cab 15 is provided with various controls required for driving. One of these controls is an ignition switch 16 having an on and an off position. The truck 10 is provided with an engine 18 housed in an engine compartment 20. The engine 18, which is typically a diesel engine, is supplied with fuel from a fuel tank 25. The engine 18 provides the power required to drive the truck 10 when the ignition switch 16 is in the on position. The engine 18 will not run when the ignition switch 16 is in the off position. A start battery 30 or primary battery is provided to start the engine 18 when the ignition switch 16 is switched from the off position to the on position. The primary battery 30 has a positive terminal 32 and a negative terminal 34. The negative terminal 34 of the primary battery 30 is connected to a ground 37. In addition to providing the power to start the engine 18, the primary battery 30 may also be used to power various electrical devices in the truck. An alternator (not shown) is also provided to supply a charging current to the primary battery 30 to maintain the primary battery's 30 electrical charge.

The truck is also provided with a sleeping compartment 40 or sleeper in which the operator may sleep while the truck 10 is not being driven. While the operator is in the sleeper 10, the engine 18 will usually not be running (i.e., the ignition switch 16 is in the off position). This is to reduce wear and tear on the truck 10 and its engine 18, save fuel, reduce emissions, and comply with "no idle" laws which prohibit the running of a truck engine while the truck is not being driven. During this time, the sleeper 40 is likely to get hot or cold depending on the ambient temperature outside the truck 10. Therefore, it is desirous to heat and cool an interior 37 of the truck 10, and specifically the sleeper 40, in a way that does not require the engine 18 to be running and does not deplete the primary battery 30.

In order to heat and cool the truck 10 while the engine 18 is not running, the truck 10 is provided with a temperature regulation system 50. The temperature regulation system 50 has a heat pump and air conditioning unit 55 or climate control unit that is capable of delivering hot or cold air to the truck 10. The climate control unit 55 preferably runs on alternating current, but is not so limited. For example, the climate control unit 55 could run on direct current.

A secondary battery 60, or set of secondary batteries as shown in FIG. 2, is used to power the temperature regulation system 50. Preferably the secondary batteries 60 are 12 volt deep cycle batteries, each having a positive terminal 62 and a negative terminal 64. Since the secondary batteries 60 are only capable of delivering direct current, an inverter 70 is provided to convert the direct current supplied by the secondary batteries 60 into alternating current for use by the climate control unit 55. The inverter 70 has a direct current input 72 comprised of a positive terminal 74 and a negative terminal 76. The negative terminals 64 of the secondary batteries 60 are connected to the negative terminal 76 of the inverter 70. A fuse 80 is provided at the positive terminal 74 of the inverter 70. The positive terminals 62 of the secondary batteries 60 are connected to the positive terminal 74 of the inverter 70 through the fuse 80. Thus, the secondary batteries 60 and the inverter 70 are connected in parallel. The negative terminals 64 of the secondary batteries 60 are connected to ground 37 through the negative terminal 34 of the primary battery 30. The inverter 70 also has an alternating current output 85 comprised of a 120 volt "HOT" 120 volt "HOT" line 90, a 120 volt "NEUTRAL" line 92 and a ground line 94. The inverter 70 itself is also connected to ground 37.

A battery condition meter 97 is connected across the positive 74 and negative 76 terminals of the inverter 70. The battery condition meter 97 is capable of providing the operator with information about the charge of the secondary batteries 60.

The inverter 70 is provided with a power switch (not shown) to turn the inverter on or off. However, to economize space the inverter will most likely be placed in an inaccessible place within the truck 10, such as under a sleeping bunk (not shown) in the sleeper 40. So that the inverter 70 may easily be turned on or off, a remote start/stop switch 100 for the inverter 70 is placed in any accessible location within the truck 10.

The three lines 90, 92, 94 comprising the alternating current output 85 of the inverter 70 are connected to a power control board 105. The power control board 105 is a relay box controlled by a microprocessor 107 and used to regulate the power supplied to the climate control unit 55. The power control board 105 regulates the power supplied to the climate control unit 55 based on instructions it receives from a control terminal 110. The power control board 105 receives electrical power for the power control board's 105 own operation from the primary battery 30. The control terminal 110 has a thermostat, microprocessor 112 and adjustable controls.

The operator may adjust the controls on the control terminal 110 to desired temperature settings to achieve a comfortable environment within the truck 10. When the actual temperature in the truck 10 falls below the operator selected temperature, the control terminal's 110 microprocessor 112 will instruct the power control board's 105 microprocessor 107 to deliver power to the climate control system 55 so that the climate control system 55 will deliver heat to the interior 37 of the truck 10 via a vent 114. When the actual temperature in the truck 10 rises above the operator selected temperature, the control terminal 110 will instruct the climate control system 55, via the microprocessors 107, 112 and the power control board 105, to deliver cooled air to the interior 37 of the truck 10 via the vent 114. To assist in the temperature regulation of the truck 10, the control terminal 110 can be provided with a switch (not shown) having "HEAT" and "COOL" positions. When the switch is in the "HEAT" position, the climate control system 55 will not deliver cooled air. When the switch is in the "COOL" position, the climate control system 55 will not deliver heat.

Preferably, the control terminal 110 is also provided with a liquid crystal display to supply the operator with temperature information and temperature regulation system 50 information. The control terminal's 110 microprocessor 112 and the power control board's 105 microprocessor 107 communicate with each other over a cable 115.

Operation of the temperature regulation system 50 will deplete the charge of the secondary batteries 60. Therefore, in order to recharge the secondary batteries 60 while the engine 18 is running, a charge solenoid 120 is provided. The charge solenoid 120 is tied to the ignition switch 16 and to ground 37 through the negative terminal 34 of the primary battery 30. When the ignition switch 16 is in the on position, the charge solenoid 120 will connect the positive terminal 32 of the primary battery 30 to the positive terminals 62 of the secondary batteries 60. Once this connection is made, the charging current supplied by the alternator will charge the secondary batteries 60. Although the temperature regulation system 50 is intended to be used when the ignition switch 16 is in the off position, it is possible to run the temperature regulation system 50 when the ignition switch 16 is in the on position. In this case, the climate control unit 55 will be powered by a combination of the charging current, the primary battery 30 and the secondary battery 37.

The truck 10 may also be provided with another heater and/or air conditioner system that is powered by the primary battery 30 and is intended to be used when the truck 10 is running. These systems may be used as a supplement to the temperature regulation system 50 to regulate the temperature of the cab 15 while the truck 10 is being driven. The operation of these additional systems is independant of the temperature regulation system 50.

Although particular embodiments of the invention have been described in detail, it is understood that the invention is not limited correspondingly in scope, but includes all changes and modifications coming within the spirit and terms of the claims appended hereto. As an example, the temperature regulation system 50 can easily be adapted to control the moisture content of the air inside the truck by replacing or supplementing the heat pump/air conditioning unit 55 with a humidifier and/or dehumidifier.

Other modifications and additions include the addition of apparatus to recharge the primary battery 30 and/or secondary batteries 60 using a conventional electrical power outlet; the use of a direct current powered climate control unit 55, thus eliminating the need for an inverter 70; and providing apparatus to instruct the temperature regulation system 50 to start the delivery of heated or cooled air to the truck 10 from a distant location.

What is claimed is:

1. A truck comprising, an internal combustion engine; a primary battery connected to start the engine; a climate control unit for controlling the temperature of an interior of the truck; a control terminal connected to regulate the climate control unit; a secondary battery connected to supply electrical power to the climate control unit; an ignition switch having an on and an off position; and a charge solenoid to connect the primary battery to the secondary battery when the ignition switch is in the on position.

2. The truck according to claim 1, wherein an operator selects a desired temperature at the control terminal and the climate control unit heats the interior of the truck to the selected temperature when the temperature of the interior of the truck falls below the selected temperature, and the climate control unit cools the interior of the truck to the selected temperature when the temperature of the interior of the truck rises above the selected temperature.

3. A truck comprising, an internal combustion engine; a primary battery connected to start the engine; a driving compartment; a sleeping compartment; an ignition switch having an on position in which the engine runs and an off position in which the engine does not run; a climate control unit for controlling the temperature of the sleeping compartment when the ignition switch is in the off position; a control terminal connected to regulate the climate control unit; a secondary battery connected to supply electrical power to the climate control unit; and a charge solenoid to connect the primary battery to the secondary battery when the ignition switch is in the on position.

4. A truck comprising, an internal combustion engine; a primary battery connected to start the engine; a climate control unit for controlling the temperature of an interior of the truck; a control terminal connected to regulate the climate control unit; a secondary battery connected to supply direct current to an inverter, wherein the inverter converts the direct current into alternating current and the inverter is connected to supply alternating current to the climate control unit.

5. The truck according to claim 4 further comprising, an ignition switch having an on and an off position; and a charge solenoid to connect the primary battery to the secondary battery when the ignition switch is in the on position for the purpose of charging the secondary battery.

6. The truck according to claim 4, wherein the inverter is provided with a remote start/stop switch.

7. The truck according to claim 4, wherein the inverter is provided with a battery condition meter.

8. A truck comprising, an internal combustion engine, a primary battery connected to start the engine; a driving compartment; a sleeping compartment; a climate control unit for controlling the temperature of the driving and sleeping compartments; a control terminal connected to regulate the climate control unit; a secondary battery connected to supply electrical power to the climate control unit; an ignition switch having an on and an off position; and a charge solenoid to connect the primary battery to the secondary battery when the ignition switch is in the on position.

9. The truck according to claim 8, wherein an operator selects a desired temperature at the control terminal and the climate control unit heats the driving and sleeping compartments to the selected temperature when the temperature of the driving and sleeping compartments falls below the selected temperature, and the climate control unit cools the driving and sleeping compartments to the selected temperature when the temperature of the driving and sleeping compartments rises above the selected temperature.

10. The truck according to claim 8, wherein the secondary battery supplies electrical power to the climate control unit via an inverter, and the inverter converts direct current from the secondary battery into alternating current for use by the climate control unit.

11. A truck comprising,, a diesel engine; a primary battery connected to start the engine; a driving compartment; a sleeping compartment; a climate control unit for controlling the temperature of the sleeping compartment and having a microprocessor controlled power control board for regulating the operation of the climate control unit by controlling a supply of electricity to the climate control unit; a microprocessor controlled control terminal, wherein an operator selects a desired temperature at the control terminal, the control terminal is connected to communicate with and instruct the power control board, and the power control board regulates the climate control unit to heat the sleeping compartment to the selected temperature when the temperature of the sleeping compartment falls below the selected temperature, and the climate control unit cools the sleeping compartment to the selected temperature when the temperature of the sleeping compartment rises above the selected temperature; and a secondary battery connected to supply direct current to an inverter, wherein the inverter converts the direct current into alternating current and the inverter is connected to supply alternating current to the power control board.

12. A truck comprising, an internal combustion engine; a primary battery connected to start the engine; a driving compartment; a sleeping compartment; a climate control unit for controlling the temperature of the sleeping compartment; a control terminal connected to regulate the climate control unit; a secondary battery connected to supply electrical power to the climate control unit; an ignition switch having an on and an off position; and a charge solenoid to connect the primary battery to the secondary battery when the ignition switch is in the on position.

13. The truck according to claim 12 further comprising, an ignition switch having an on and an off position; and a charge solenoid to connect the primary battery to the secondary battery when the ignition switch is in the on position.

14. The truck according to claim 12, wherein an operator selects a desired temperature at the control terminal and the climate control unit heats the sleeping compartment to the selected temperature when the temperature of the sleeping compartment falls below the selected temperature, and the climate control unit cools the sleeping compartment to the selected temperature when the temperature of the sleeping compartment rises above the selected temperature.

15. The truck according to claim 12, wherein the secondary battery supplies electrical power to the climate control unit via an inverter, and the inverter converts direct current from the secondary battery into alternating current for use by the climate control unit.

* * * * *

UNITED STATES PATENT AND TRADEMARK OFFICE
CERTIFICATE OF CORRECTION

PATENT NO. : 5,899,081
DATED : May 4, 1999
INVENTOR(S) : Evans et al.

It is certified that error appears in the above-identified patent and that said Letters Patent is hereby corrected as shown below:

Column 5, Line 40, Claim 11, delete "comprising,," and insert --comprising,--.

Column 6, delete Lines 27-30 (Claim 13).

Signed and Sealed this

Second Day of November, 1999

Attest:

Q. TODD DICKINSON

Attesting Officer

Acting Commissioner of Patents and Trademarks